C. R. TANSILL.
LOADING AND DISCHARGING WAGON BODY.
APPLICATION FILED JAN. 16, 1912.
1,038,230.
Patented Sept. 10, 1912.
4 SHEETS—SHEET 1.
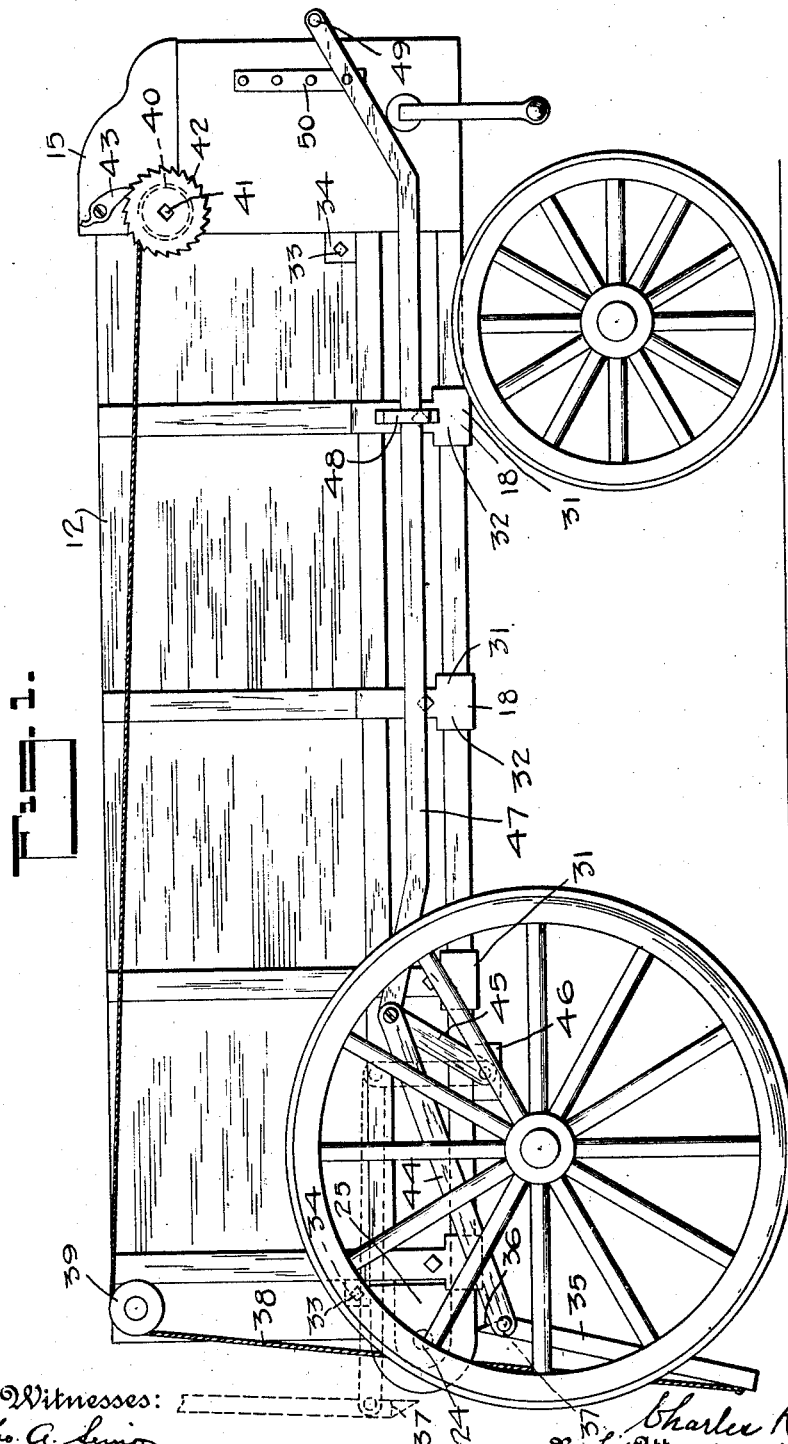

C. R. TANSILL.
LOADING AND DISCHARGING WAGON BODY.
APPLICATION FILED JAN. 16, 1912.
1,038,230.
Patented Sept. 10, 1912.
4 SHEETS—SHEET 2.
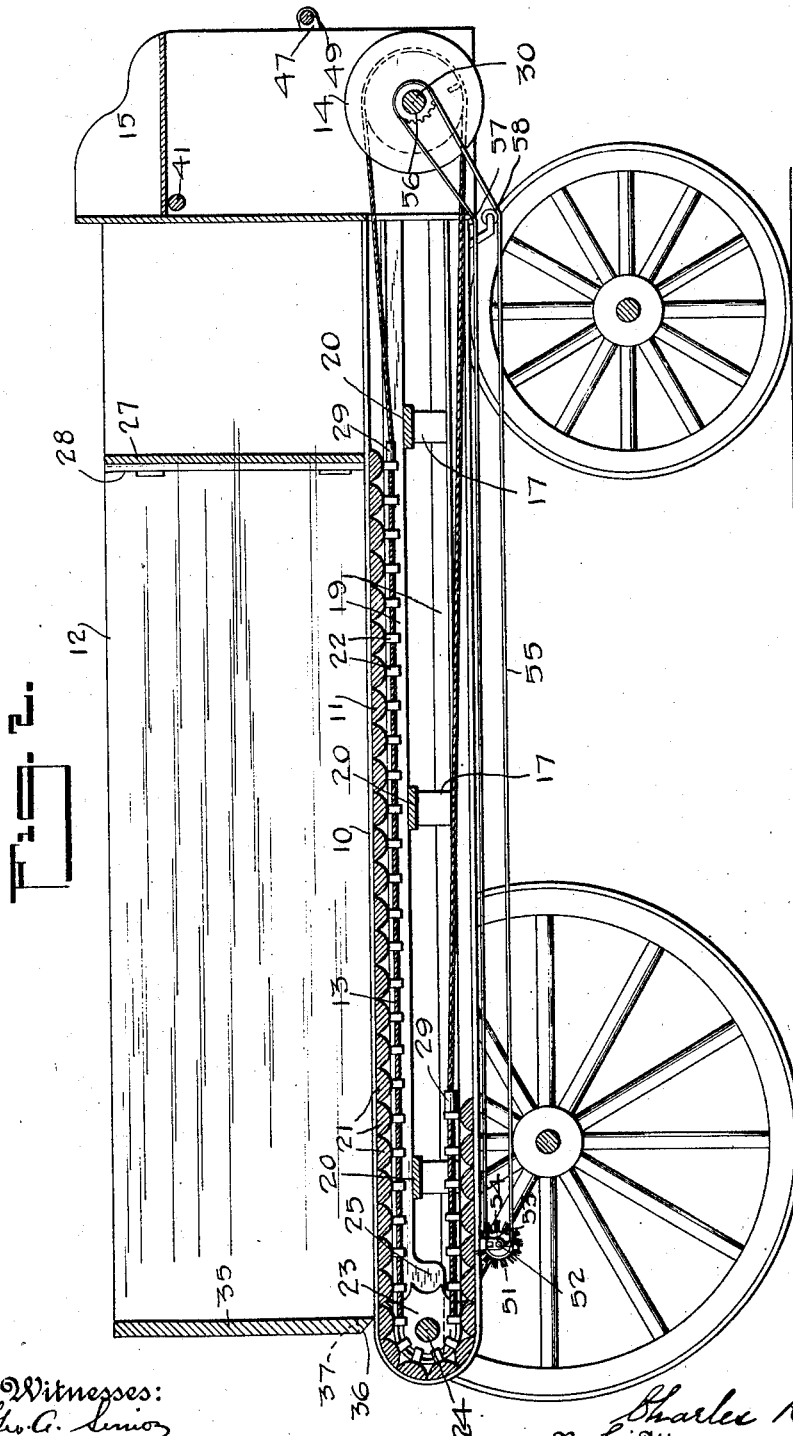

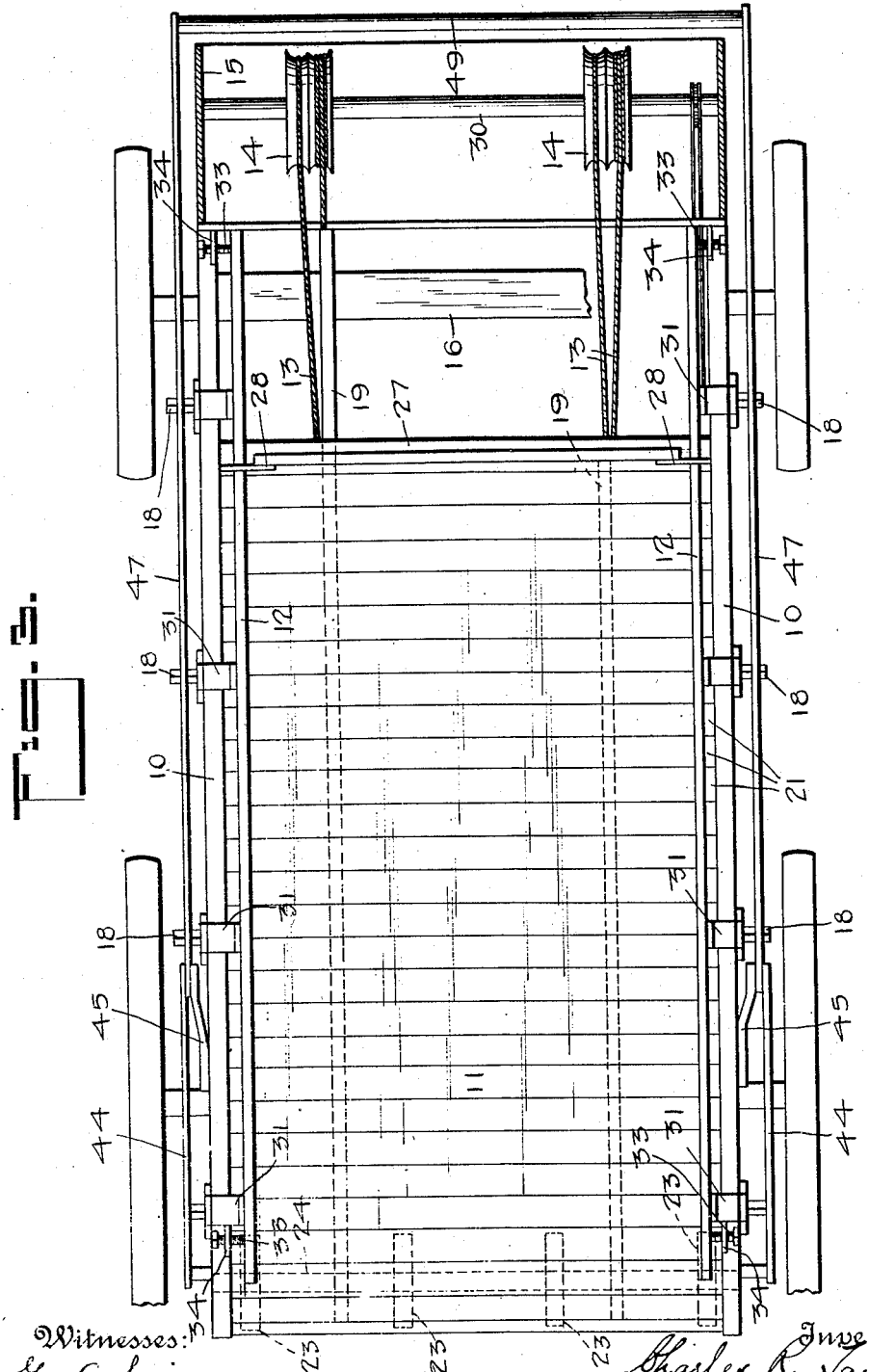

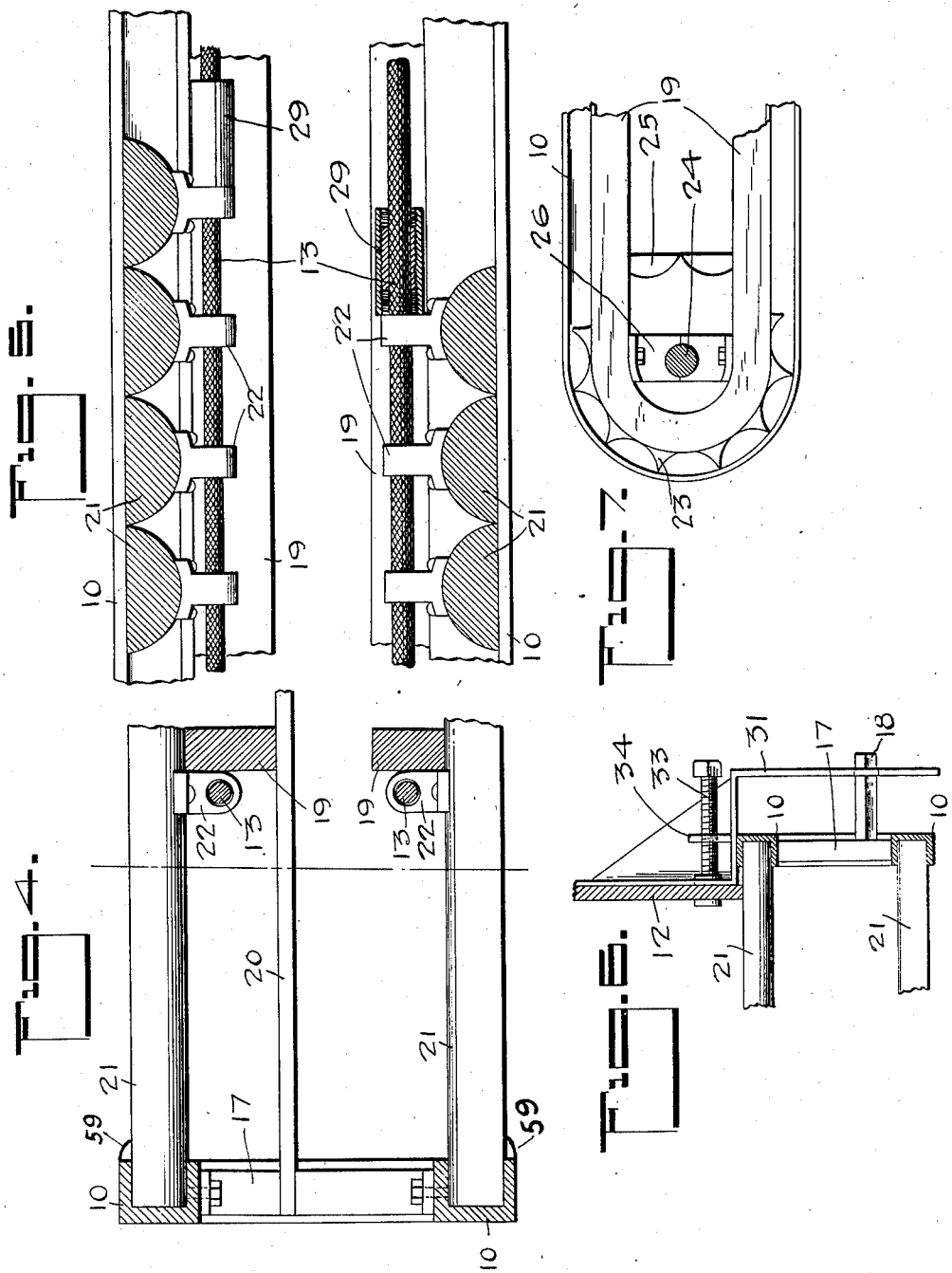

UNITED STATES PATENT OFFICE.

CHARLES R. TANSILL, OF NEW YORK, N. Y.

LOADING AND DISCHARGING WAGON-BODY.

1,038,230.  Specification of Letters Patent.  Patented Sept. 10, 1912.

Application filed January 16, 1912. Serial No. 671,448.

*To all whom it may concern:*

Be it known that I, CHARLES R. TANSILL, a citizen of the United States, residing in the borough of Brooklyn of the city of New York, in the county of Kings and State of New York, have invented a new and useful Loading and Discharging Wagon-Body, of which the following is a specification.

My invention relates to a loading and discharging wagon body having a flexible bottom or bed which moves forwardly or rearwardly on an upper horizontal rail plane and on an underlying and parallel rail plane, and the objects of my invention are to provide, (1) a loading and discharging wagon body in which bulky articles may be placed on the flexible bed at the rear end of the bed and in turn moved forward with the flexible bed until the wagon body is fully loaded, and whereby the load may be discharged by reverse movement of the flexible bed, (2) a loading and discharging wagon body for carrying high grade brick, tiles and similar articles which are liable to be chipped or broken, (3) a loading and discharging wagon body for carrying sand, cement or liquid asphalt, (4) a loading and discharging wagon body from which the load may be discharged in mass, or in disconnected portions, or continuously, that is, spread, (5) a loading and discharging wagon body provided with means for scraping or cleaning the flexible bed thereof, (6) a loading and discharging wagon body having sides capable of being expanded or spread apart, thereby removing the points of contact or friction of the load on the sides should such contact or friction arise and form a jam or dam of the load and interfere with the discharging thereof, and (7) a loading and discharging wagon body having sides capable of being expanded or spread, thereby providing a wagon body of increased width and particularly available for furniture vans in receiving articles of furniture of unusual size or width. I accomplish these objects by the device illustrated in the accompanying drawings in which—

Figure 1, is a side elevation of my loading and discharging wagon body mounted upon wheel supports. Fig. 2, is a vertical section of my loading and discharging wagon body mounted upon wheel supports. Fig. 3, is a plan view of my loading and discharging wagon body mounted upon wheel supports with part of the wagon body in section. Fig. 4, is a detail section of the rail, flexible bed, cable clips and bed-supports of my loading and discharging wagon body. Fig. 5, is a detail sectional view of my loading and discharging wagon body on the line 5—5 of Fig. 4. Fig. 6, is a detail sectional view of a side and the means for supporting and expanding or spreading the side of my loading and discharging wagon body. Fig. 7, is a detail sectional view of the manner of supporting the sprocket shaft.

Similar numerals refer to similar parts throughout the several views.

My loading and discharging wagon body comprises in its main features the rails, 10, a flexible bed or bottom, 11, sides, 12, cables, 13, wind and unwind wheels, 14, for the cables, and a seat or driver's extension, 15, the device being supported by secure and suitable means of attachment to cross-bars, 16, fastened to the bars of the springs and running gear of the wheel support.

The rails, 10, are preferably of metal, two in number and are arranged one rail on either side of the wagon body. Each rail, 10, is in the form of a U lying upon its side or horizontally with the opening of the U toward the front of the wagon body, and in cross-section is of channel form, the flanges forming the channels extending inward toward the interior of the wagon body, the effect of the use of this horizontally placed U form of rail being to provide an upper horizontal rail channel or rail-plane extending rearward from the seat or driver's extension, 15, of the wagon body and turning downward at the rounded end of the U and continuing forward in an under-lying and parallel rail-channel or rail-plane.

Posts or pillars, 17, consisting of vertical plates flanged at their tops and bottoms are fastened by their flanges between the upper and the under-lying portions of the rails, 10, to give rigidity to the rails, 10. Each of the posts or pillars, 17, is provided with a horizontally extending stud, 18, projecting outward from the post or pillar, 17, the purpose of which is hereinafter more fully set forth.

Longitudinal bed-supports, 19, of horizontally placed U shape in conformity to the shape of the rails, 10, extend from the seat or driver's extension, 15, rearward, downward and forward again to the extension, 15, in upper horizontal and underlying and parallel planes. The bed-supports, 19, are attached to cross-bars, 20, fastened to the posts, 17, the upper faces of the upper portions of the bed-supports, 19, and the under faces of the underlying portions of the bed-supports, 19, being arranged to come in contact with the rail engaging surface of the flexible bed, 11, as the bed is moved forwardly or rearwardly. The object of the bed-supports, 19, is threefold: to resist downward pressure on the flexible bed, 11, on its interior surface, to afford additional rail support for the flexible bed, and to provide guides for the cables, 13, as hereinafter more fully shown. The bed-supports, 19, in wagon bodies intended to carry loads of moderate weight may be made of wood, but in wagon bodies for heavy loads they should be of metal.

The flexible bed, 11, is composed of narrow strips or slats, 21, arranged in series transversely of the wagon body with their longitudinal edges in contact, the strips, 21, as a whole forming a bottom or bed on the upper rail plane of the rails, 10, extending, when the wagon body is loaded, from the driver's extension, 15, rearward and downward and around and for a short distance into the underlying rail plane of the rails, 10. Each strip, 21, is flat on its upper or load bearing surface and is rounded on its reverse or rail engaging surface to reduce the friction when the strip engages or slides on the flanges of the rails, 10, and on the bed-supports, 19. The strips, 21, are arranged on the rails, 10, reference being had to the strips as lying in the upper rail plane, between the rails, 10, so that the ends of the strips enter the channels of the rails, 10, slide on the lower horizontal flange of the rail channels and clearance of the upper horizontal flange of the rail channels by the upper faces of the strips, 21, while the rounded or reverse faces thereof engage or slide on the lower horizontal flange of the rail channels and on the upper faces of the bed-supports, 19. When the strips, 21, lie in the rail channels of the underlying rail plane of the rails, 10, the position of the flat and the rounded faces of the strips, 21, are reversed. In wagon bodies for loads of moderate weight the strips, 21, may be of hard wood, but for heavy weight loads they should be of metal.

Each of the strips, 21, is provided with two cable clips, 22, so placed on the strips that when the strips are in position in the channels of the rails, 10, the inner side of each clip, 21, the words inner and outer are here used as related to the inner and outer sides of the wagon body, will lie against the outer side of each of the bed-supports, 19, the intention being that the bed-supports, 19, will act as guides for the cables, 13, connecting the strips, 21, and will preserve the clearance of the ends of the clips in the rail channels and also prevent lateral movement of the strips, 21, between the rails, 10.

Sprockets, 23, are arranged at the rear of my wagon body between the rounding portions of the rails, 10, the sprockets, 23, being attached to and turning with an idle shaft, 24, journaled at each of its ends in plates, 25, attached to the rails, 10, the shaft, 24, being provided with interior bearing supports, 26, Fig. 7, consisting of plates with holes to receive the shaft, 24, attached to the inner sides of the bed-supports, 19. The teeth of the sprockets, 23, conform to the round of the rail engaging faces of the strips, 21, composing the bed, 11, the intention of the sprockets, 23, being to strengthen and support the strips, 21, at the point where the load is received and also by engaging with the strips, 21, to assist them in taking the rounding end of the rails, 10, and facilitate the forward and rearward movement of the bed, 11, on the rails, 10.

A fore-end, 27, of substantially the same height as the sides, 12, is attached to the most forwardly of the strips, 21, of the bed, 11, so as to move forwardly and rearwardly with the strip, 21, to which it is attached. The fore end, 27, is provided with sliding extensions, 28, the object of which is hereinafter more fully set forth. The intention of the fore-end, 27, is to afford a means for containing and discharging sand, cement, liquid asphalt and similar material in and from my wagon body. The fore-end, 27, may be made removable if desirable.

The cables, 13, pass through the cable clips, 22, from one end of the bed, 11, to the other, and are provided at each end with a stop and take up member, 29, bearing against the clips, 22, on the end strips, 21, of the bed, 11, the take up feature thereof being intended to remedy any slackening of the cable, 13.

The cables, 13, are operated by wind and unwind wheels, 14, attached to and turning with a shaft, 30, journaled in each side of the driver's extension, 15, of my wagon body. The shaft, 30, may be further strengthened by journal bearings located in the interior of the extension, 15, if necessary to enable it to withstand the strain of the cables, 13, on the wheels, 14. The wind and unwind wheels, 14, and cables, 13, are so arranged that the revolution of the wheels, 14, causes one set of the cables, 13, upper or lower as the case may be, to be wound up on the wheels, 14, while the other set of cables is released or played out correspondingly, thus imparting to the bed, 11, a forward and rearward motion. The strain on the cables, 13, to wind them up is arranged against the stop and take up members, 29, at the extreme ends of those cables, the intention of this arrangement being that such strain will cause the strips, 21, composing the bed, 11, confined in the channels of the rails, 10, to press the more tightly together at their edges, thus affording a bed surface without openings or interstices and adapted to contain sand, cement, liquid asphalt and similar material. The shaft, 30, may be operated from the ground by one man by a crank-handle on one side or by two men by a crank-handle on each side of my wagon body, or the shaft, 30, may be operated by the driver from his seat by suitable means brought within his reach.

The sides, 12, are supported in vertical position by brackets, 31, having vertical or upward extending portions attached to the outer faces of the sides, 12, horizontally extending portions bearing on the upper flange surface of the rails, 10, and downwardly extending portions with eyes, 32, at their lower ends which engage or fit over and bear on the horizontally extending studs, 18, of the posts, 17, the intention of the brackets, 31, being to support the sides, 12, in a vertical position so that their bottoms just clear the load surface of the flexible bed, 11, with a space intervening between the outer faces of the sides at their bottoms and the inner edges of the rails 10, while the weight of the sides 12, is borne by the horizontally extending portions of the brackets, 31, bearing upon the upper flange surfaces of the rails, 10, and by the eyes, 32, of the brackets, 31, bearing upon the studs, 18, the sides, 12, thus being permitted to be moved outward or spread the distance of the space intervening between the outer face of the sides, 12, at their bottoms and the inner edge of the rails, 10, Fig. 6. The spreading of the sides, 12, is effected by screw-threaded members, 33, turning loosely in holes in the sides, 12, near the front and rear ends of the wagon body. The members, 33, have a head on the interior of the sides, 12, and a shoulder on the exterior of the sides to hold the member in place in the sides. The members, 33, operate in plates, 34, having a screw-threaded hole to receive the member, attached to and extending upward from the rails, 10, in correspondence with the position of the holes above mentioned in the sides, 12, the effect of screwing the members, 33, outward or inward in the plates, 34, being to pull out or push in the sides, 12, and give a sliding movement to the sides. The members, 33, also hold the sides, 12, rigid vertically. For convenience the members, 33, may be provided with heads to receive the same crank-handle that is used to operate the wind and unwind wheels, 14.

The driver's extension, 15, of my wagon body comprises sides, a back, a front and a seat for the driver or operator, and may be provided on its front with the usual foot-platform for the driver. The extension, 15, is supported by forwardly extending portions of the rails, 10, and is securely attached thereto, and is of such form and construction as to provide for the locating, operating and strain of the wind and unwind wheels, 14, and the wheels, 40, for the tail gate cables.

My loading and discharging wagon body is provided with a tail board or tail gate, 35. The tail gate, 35, in width extends from outer edge to outer edge of the rails, 10, and in height is the same as the sides, 12.

The tail gate, 35, at its bottom has a beveled edge, 36, which if the tail gate be made of wood should be iron shod, the vertical portion of the beveled edge, 36, being toward the interior of the wagon body, and provided at its ends with rectangular recesses, 37, to permit the beveled edge to be brought into scraping contact with the load surface of the bed, 11, for the purpose hereinafter set forth.

A cable, 38, is attached to the front face of the tail gate, 35, at each of the outer edges of the face and near the top of the tail gate, passing over an idle or guide wheel, 39, on each of the sides, 12, near the tops thereof and thence forward to a winding or drum wheel, 40, on each of the sides of the driver's extension, 15. The wheels, 40, are attached to and turn with a shaft 41, journaled in the sides of the driver's extension, 15, and extending across the extension, 15, the winding wheels, 40, being operated by suitable means attached to the shaft, 41, within reach of the driver. The cables, 38, are so arranged on the winding wheels, 40, that they will wind and unwind uniformly. One of the winding wheels 40, is provided with a ratchet wheel, 42, and pawl, 43, to control the winding and unwinding of the cables, 38.

A link bar, 44, is pivoted at its right end on each edge of the tail gate, 35, at the bottom of the tail gate near the beveled edge 36, thereof, and at its forward end to an intermediate link bar, 45, which is pivoted on a plate, 46, attached to the under side of each of the rails, 10. A sliding arm, 47, is pivoted at its rear end to each of the intermediate link bars, 45, and extends forward through a guide, 48, attached to one of the posts, 17, on each of the outer sides of the wagon body and thence forward and along the extension, 15, where it is connected with its companion sliding arm, 47, of the other side of my wagon body by a transverse bar, 49. A locking means, 50, consisting of a pin engaging holes in the arm, 47, and in the side of the extension, 15, is used to hold the arms, 47, in a desired position, but instead of a pin and holes any suitable means may be employed for this purpose.

The sliding arms, 47, are of the shape shown in Figs. 1 and 2, and are intended to hold the beveled edge, 36, of the tail gate in contact with the load surface of the bed, 11, when the bed is in the underlying rail planes or channels to act as a scraper for cleaning the bed, Fig. 1, and also in connection with the intermediate link bars, 45, and link bars, 44, when downward pressure is applied to the transverse bar, 49, and the tail gate, 35, is raised by the cables, 38, to push rearward the tail gate until the link bars, 44, and intermediate link bars, 45, and the tail gate assume the position shown in outline, Fig. 1, and then to draw the tail gate forward into closing relation with the ends of the sides, 12, and the load surface of the bed, 11, at the rear of the wagon body. To permit distributive or partial discharge of the load when the tail gate is in closing position pressure is applied to the transverse bar, 49, and the cables, 38, unwound, when the action of the sliding arms, 47, intermediate link bars, 45, and link bars, 44, will push the tail gate outwardly into relation of clearance with the ends of the sides of the wagon body and the load surface of the bed regulated by the unwinding of the cables, 38, and the amount of pressure on the transverse bar, 49. To discharge in mass the cables, 38, are released and pressure on the transverse bar, 49, relieved when the tail gate, 35, will swing around and downward into a position under the U rails, Fig. 1.

If the extension, 15, is provided with a foot platform for the driver operation of the bar, 49, may be had by suitable means extending from the bar, 49, through the foot-platform within reach of the driver.

For the purpose of cleaning the load surface of the bed, 11, by brushing it off, a brush, 51, preferably of wire, is provided. The brush, 51 extends transversely of my wagon body and turns with a shaft, 52, journaled at each of its ends in a bracket, 53, attached to the under side of each of the rails, 10, near the rear end of the wagon body. The brush, 51, is operated by a sprocket wheel, 54, at each of its ends turning with the shaft, 52. Each of the sprocket wheels, 54, is connected by a sprocket chain, 55, with a forward sprocket wheel, 56, attached to each of the outer ends of and turning with the shaft, 30, of the wind and unwind wheels, 14, the sprocket chain, 55, having an upper roller guide, 57, and an under roller guide, 58, attached to the under portion of each of the rails, 10, at the forward end of the rails, the intention being that when the wind and unwind wheels, 14, are operated to draw the bed, 11, forward or rearward in the underlying rail plane of the rails, 10, the brush, 51, being in contact with the load surface, in reverse from its load or normal position, of the bed, 11, will revolve and brush off the load surface of the bed, 11.

The operation of my loading and discharging wagon body is as follows:—To load with bulky articles, such as bales, boxes or barrels, the flexible bed, 11, is moved rearward by the revolution of the wind and unwind wheels, 14, and the pull of the cables, 13, so that the greater portion of the bed, 11, is in the underlying rail plane of the rails, 10, with sufficient of the bed, 11, remaining in the upper rail plane to receive the load at the rear end of the wagon body, the tail gate, 35, first having been lowered to a position out of the way. The articles composing the load are then placed piece by piece upon the bed 11, the bed being drawn forward by operation of the wheels, 14, and cables, 13, as necessary until the wagon body is fully loaded, when the tail gate is raised to a closing position and the loaded wagon is ready to proceed to its destination. To unload the operation is reversed, the flexible bed, 11, being moved rearward and the articles composing the load taken therefrom as each in turn reaches the rear end of the wagon body. Such articles as bales, barrels, boxes, brick and tile may be loaded and unloaded in tiers. It is thus seen that my loading and discharging wagon body obviates the necessity for a man in loading or unloading to work within the body itself, that is carrying into and setting in place the various articles composing the load, the articles instead being placed in load position at the rear end of the wagon body and taken from and brought to him again at the rear end of the wagon body, without the labor of lifting or rolling the articles as in the case of wagon bodies of the customary form.

If any of the articles composing the load should bind or jam against the sides of my wagon body and interfere with the free movement of the bed, 11, the contact may be removed by spreading or expanding the sides of my wagon body by means of the bracket, 31, with eyes, 32, and the spreading members, 33, hereinbefore described. Additional width between the sides may be obtained by the same means should such additional width be required, as to load a piece of furniture of unusual width, or it may be desirable to increase the capacity of the wagon body to carry a larger load of sand, liquid asphalt or similar material, in which case the fore end, 27, may be extended to meet the greater width between the sides by drawing outward the sliding extensions, 28, thereof.

To discharge the load in mass when the load is capable of discharge in this manner, such as earth, sand or liquid asphalt, the tail gate, 35, is dropped out of the way and the flexible bed, 11, moved rearward until all the material is drawn beyond the rear end of the wagon body and deposited upon the desired spot, and this, if the means for operating the wind and unwind wheels, 14, be brought within reach of the driver, may be accomplished by him without the neces-
sity for him to leave his seat.

To unload by degrees or spread such material as earth, sand or liquid asphalt the tail gate cables, 38, are unwound to such an extent and such pressure applied to the transverse bar, 49, that a space or clearance is provided between the edge, 36, of the tail gate and the load surface of the flexible bed, 11, and if the bed be moved rearward the material will fall from the wagon body through this space, the amount so discharged being governed by the width of this space and the length of time this space is kept open while the flexible bed, 11, is moved rearward.

In unloading fine sand, liquid asphalt or similar material, such material may work into the channels of the rails, 10, at the extreme ends of the strips, 21, of the bed, 11, as the strips, 21, in moving rearwardly make the turn of the rounded end of the rails, 10, due to the flat upper surfaces of the strips, 21. To obviate this a guard, 59, Fig. 4, is attached to each end of the strips 21, and arranged just to clear the upper flanges of the rails, 10, and prevent the entrance of the sand or other materials into the rail channels, such guards, 59, being fitted only on my wagon bodies intended to carry sand, liquid asphalt and similar materials. Forward and rearward movement of the bed, 11, will then cause the beveled edge, 36, to scrape the load surface of the bed, 11, and at the same time the brush, 51, which is arranged to revolve by the same operation which causes the bed, 11, to move forwardly and rearwardly, being in contact with the load surface of the bed, 11, in the underlying tail plane will brush off the load surface of the bed, 11. To facilitate the movement of the flexible bed, 11, forwardly and rearwardly the flanges of the rails, 10, and the surface of the bed supports, 19, engaging the rounded faces of the strips, 21, composing the bed, 11, may be greased.

I claim:—

1. A loading and discharging wagon body comprising parallel rails of horizontal U shape with their rounded ends toward the rear of the wagon body, said rails being of channel form in cross-section with the flanges of the channels toward the interior of the wagon body, the forwardly extending portions of each rail forming an upper horizontal rail channel and an underlying rail channel parallel thereto, a series of strips arranged transversely of the U rails having their ends engaging the channels of the rails and their longitudinal edges in contact, said series of strips extending rearwardly in the upper rail channels of the U rails and downwardly and in conformity to the rounded ends of the channels thereof into the underlying rail channels, each strip having a flat face to receive the load and a rounded face to engage the rails, cables connected to the rounded faces of the strips and to wind and unwind wheels for moving the strips conformably to the horizontal U rails, the cables having end stops whereby the strain of the wind and unwind wheels on the cables to move the strips maintains the contact of the strips at their edges, means for operating the wind and unwind wheels, and interior supports for the strips and guides for the cables extending longitudinally between the horizontal U rails and conforming to the shape thereof; substantially as set forth.

2. A loading and discharging wagon body comprising parallel rails of horizontal U shape with the rounded ends thereof toward the rear of the wagon body, said rails being of channel form in cross-section with the flanges of the channels toward the interior of the wagon body, the forwardly extending portions of each rail forming an upper horizontal rail channel and an underlying rail channel parallel thereto, a series of strips arranged transversely of the U rails with their ends engaging the channels thereof and their longitudinal edges in contact, each strip having a flat face to receive the load and a rounded face to engage the rails, said series of strips extending rearwardly in the upper horizontal channels of the U rails and downwardly and in conformity to the rounded ends of the channels thereof into the underlying rail channels and movable in conformity to the horizontal U rails, and cables connected to the rounded faces of the strips having end stops whereby the strain on the cables maintains the contact of the strips at their edges; substantially as set forth.

3. In a loading and discharging wagon body the combination of parallel rails of horizontal U shape with the rounded ends thereof toward the rear of the wagon body, said rails being of channel form in cross-section with the flanges of the channels toward the interior of the wagon body, the forwardly extending portions of each rail forming an upper horizontal rail channel and an underlying rail channel parallel thereto, a series of connected strips arranged transversely of the U rails with their ends engaging the channels thereof each strip having a flat face to receive the load and a rounded face to engage the rails, said series of strips extending rearwardly in the upper horizontal rail channels and downwardly and in conformity to the rounded ends of the U rails into the underlying rail channels and movable in conformity to the horizontal U rails, and sprocket-wheels fixed to and turning with a shaft located transversely of the U rails at the rounded ends thereof, said sprocket wheels having teeth engaging the rounded faces of the strips to assist the strips in moving conformably to the channels of the rounded ends of said rails; substantially as set forth.

4. In a loading and discharging wagon body the combination of parallel rails of horizontal U shape with their rounded ends toward the rear of the wagon body, said rails being of channel form in cross-section with the flanges of the channels toward the interior of the wagon body, the forwardly extending portions of each rail forming an upper horizontal rail channel and an underlying rail channel parallel thereto, sides, and brackets attached to the sides engaging horizontally extending studs attached to said upper and underlying rail channels for supporting the sides in vertical position and permitting horizontal movement of the sides outwardly and inwardly in their vertical position; substantially as set forth.

5. In a loading and discharging wagon body the combination of parallel rails of horizontal U shape with their rounded ends toward the rear of the wagon body, said rails being of channel form in cross-section with the flanges of the channels toward the interior of the wagon body, the forwardly extending portions of each rail forming an upper horizontal rail channel and an underlying rail channel parallel thereto, sides, brackets attached to the sides engaging horizontally extending studs attached to said upper and underlying rail channels for supporting the sides in vertical position and permitting horizontal movement of the sides outwardly and inwardly in their vertical position, and means for moving the sides outwardly and inwardly in their vertical position; substantially as set forth.

6. In a loading and discharging wagon body the combination of parallel rails of horizontal U shape with their rounded ends toward the rear of the wagon body, said rails being of channel form in cross-section with the flanges of the channels toward the interior of the wagon body, the forwardly extending portions of each rail forming an upper horizontal rail channel and an underlying rail channel parallel thereto, a flexible bed having its edges engaging the channels of the U rails and extending rearwardly in the upper horizontal rail channels and downwardly and in conformity to the channels of the rounded ends of the U rails into the underlying rail channels and movable conformably to the horizontal U rails, sides, a tail gate, and means for bringing the tail gate into relations of contact or regulated clearance with the ends of the sides of the wagon body and the load surface of the flexible bed and for bringing the bottom edge of the tail gate into scraping contact with the load surface of the flexible bed; substantially as set forth.

7. In a loading and discharging wagon body the combination of parallel rails of horizontal U shape with their rounded ends toward the rear of the wagon body, said rails being of channel form in cross-section with the flanges of the channels toward the interior of the wagon body, the forwardly extending portions of each rail forming an upper horizontal rail channel and an underlying rail channel parallel thereto, a flexible bed having its edges engaging the channels of the horizontal U rails and extending rearwardly in the upper horizontal rail channels and downwardly and in conformity to the channels of the rounded ends of the U rails into the underlying rail channels and movable conformably to the horizontal U-rails, sides, a tail gate having a beveled bottom edge with a recess in each end of the edge, cables attached to the inner face of the tail gate near the top thereof, guide wheels for the cables on the sides of the wagon body at the upper rear ends thereof, winding wheels for the cables on said sides at the front ends thereof, means for operating and controlling said winding wheels, link bars pivoted at their rear ends to the sides of the beveled edge of the tail gate, intermediate link bars pivoted at their upper ends to the forward ends of the link bars and at their lower ends to plates attached to the under sides of the underlying rail channels, sliding arms pivoted at their rear ends to the forward ends of the link bars and to the upper ends of the intermediate link bars and extending forwardly along the sides of the wagon body, guides for the forwardly extending portions of the sliding arms, and a transverse bar connecting said forwardly extending portions; substantially as set forth.

CHARLES R. TANSILL.

Witnesses:
W. H. GEE,
S. G. AST.